(12) United States Patent
Roessle et al.

(10) Patent No.: US 9,170,176 B2
(45) Date of Patent: Oct. 27, 2015

(54) CONTROL SYSTEM AND METHOD FOR DETECTING THE ROTATIONAL SPEED OF AN INTERNAL COMBUSTION ENGINE

(75) Inventors: Markus Roessle, Ludwigsburg (DE); Ewald Mauritz, Weissach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 145 days.

(21) Appl. No.: 13/988,481

(22) PCT Filed: Oct. 14, 2011

(86) PCT No.: PCT/EP2011/067963
§ 371 (c)(1),
(2), (4) Date: Aug. 9, 2013

(87) PCT Pub. No.: WO2012/069255
PCT Pub. Date: May 31, 2012

(65) Prior Publication Data
US 2013/0325246 A1    Dec. 5, 2013

(30) Foreign Application Priority Data

Nov. 23, 2010  (DE) .......................... 10 2010 061 769

(51) Int. Cl.
*G01M 17/00* (2006.01)
*G01M 15/04* (2006.01)
*F02D 41/00* (2006.01)
*F02N 11/08* (2006.01)
*F02D 41/04* (2006.01)

(52) U.S. Cl.
CPC ........... *G01M 15/046* (2013.01); *F02D 41/009* (2013.01); *F02D 41/0097* (2013.01); *F02N 11/0855* (2013.01); *F02D 41/042* (2013.01); *F02D 2250/06* (2013.01)

(58) Field of Classification Search
USPC ......................................................... 701/29.1
See application file for complete search history.

(56) References Cited

U.S. PATENT DOCUMENTS

| 5,086,741 | A | * | 2/1992 | Nakamura et al. | 123/406.2 |
| 6,082,330 | A | * | 7/2000 | Alberter et al. | 123/436 |
| 8,855,888 | B2 | * | 10/2014 | Suzuki | 701/99 |
| 2006/0016413 | A1 | | 1/2006 | Satake et al. | |
| 2006/0021596 | A1 | * | 2/2006 | Maeda et al. | 123/406.26 |
| 2006/0081207 | A1 | * | 4/2006 | Nakamura | 123/179.3 |
| 2009/0282903 | A1 | * | 11/2009 | Nagano et al. | 73/114.15 |

FOREIGN PATENT DOCUMENTS

| DE | 199 33 844 | 1/2001 |
| DE | 101 23 022 | 11/2002 |

(Continued)

OTHER PUBLICATIONS

McDonald D, "Engine Position Tracking at Shutdown" SAE Techincal Paper Series, Society of Automotive Engineers, Warrendale, PA, US Nr. 2005-01-0048, Apr. 11, 2005, Seiten 1-17, XP002385239.

*Primary Examiner* — Hussein A. Elchanti
(74) *Attorney, Agent, or Firm* — Kenyon & Kenyon LLP

(57) ABSTRACT

A method for detecting rotational speeds (n) of an internal combustion engine having a signal wheel having marks (M1 through M7) for signaling on a crankshaft of the internal combustion engine is described. The marks (M1 through M7) on the signal wheel are detected with the aid of a sensor and evaluated by a detection and evaluation device. To implement high-precision detection of a rotational speed, the rotational speeds (n) are evaluated using a sector section of approximately 6° to 35° to increase the accuracy on the basis of a reduced sector section of the signal wheel.

12 Claims, 7 Drawing Sheets

(56) References Cited

FOREIGN PATENT DOCUMENTS

| | | |
|---|---|---|
| DE | 101 43 954 | 4/2003 |
| DE | 10 2006 011 644 | 9/2007 |
| DE | 10 2008 040 830 | 2/2010 |
| FR | 2942852 | 9/2010 |
| GB | 2374150 | 10/2002 |
| JP | 2000088866 | 3/2000 |
| JP | 2001059441 | 3/2001 |
| WO | WO2008064646 | 6/2008 |

* cited by examiner

CONTROL SYSTEM AND METHOD FOR DETECTING THE ROTATIONAL SPEED OF AN INTERNAL COMBUSTION ENGINE

FIELD OF THE INVENTION

The present invention relates to a method for detecting rotational speeds of a crankshaft of an internal combustion engine using a signal wheel having marks on the crankshaft, the marks on the signal wheel being detected and evaluated by a detection and evaluation device with the aid of a sensor. The present invention also relates to a computer program product and a control system having a detection device and an evaluation device including a microcomputer having a program memory.

BACKGROUND INFORMATION

It is known to detect the rotational speed of an internal combustion engine on a crankshaft for an engine control unit for synchronization purposes for precisely timed injection into the individual cylinders. For this purpose, the rotational movement of a gearwheel situated on the crankshaft is detected by a sensor. The gearwheel is synchronizable. At least one or two defined tooth gaps are provided for this purpose.

For example, a method for rotational speed detection on an internal combustion engine is known from German Published Patent Application No. 101 23 022 or German Patent Specification No. 101 43 954. Teeth on a gearwheel mounted on a crankshaft are scanned with the aid of a sensor.

German Published Patent Application No. 10 2006 011 644 describes a device and a method for detecting peripheral speeds of two transmission parts in order to have them mesh with one another at a definable peripheral speed for starting the internal combustion engine.

German Published Patent Application No. 10 2008 040 830 describes a method and a device of a start-stop control for an internal combustion engine so that a pinion driven by a starter motor meshes with an annular gear of a coasting internal combustion engine.

German Published Patent Application No. 199 33 844 A1 describes a device for detecting the reverse rotation of a rotating part of an internal combustion engine.

SUMMARY

An object of the present invention is to refine a method, a control system and a computer program product of the type defined at the outset in such a way that a high-precision detection of the rotational speed is implementable.

One aspect of the present invention is to reduce a sector section of the signal wheel to be scanned, in particular to evaluate a sector section of approximately 6° to 35° to increase the accuracy of a determination of the rotational speed of the internal combustion engine.

Traditionally, in order to detect the rotational movement, the passing by of multiple teeth is detected by a sensor, and the corresponding absolute time, i.e., the tooth time, is recorded in a table. Since the geometric spacing of the teeth is known, a rotational speed and an angle may be calculated based on the tooth times. The rotational speed is usually calculated from an average over multiple elapsed tooth times. Typically six teeth are to be calculated, but not all teeth are taken into account or there is a calculation by segments to obtain a preferably smoothed signal. Depending on the rotational speed, computation time, the maximum length of the tooth time table and selected averaging, certain tooth times are not included in the calculation under some circumstances. Furthermore, there is at least one tooth gap to synchronize a crankshaft. Another advantage is that a traditional signal wheel may be used and an increased measurement accuracy may be achieved simply by programming the software using standardized hardware. The marks may be teeth, for example, which are scanned with the aid of an optical sensor or a Hall sensor.

To describe a rotational speed below an idling rotational speed of the internal combustion engine with the greatest possible accuracy, the traditional calculation is not sufficient since inaccuracies may thus result. Therefore, according to the present invention, a more accurate method for detecting and evaluating the rotational speed is carried out in particular when the rotational speed is lower than the idling rotational speed. Thus a sector section of approximately 6° to 35°, in particular 18°, is evaluated. An averaging is omitted since a greater accuracy is thus achieved. In other words, a rotational speed is detected and evaluated for each individual sector section up to 30° or 35°. This detected signal may be processed by the engine control unit in a variety of ways. On the one hand, an even more accurate injection into the internal combustion engine and a corresponding activation of the valves are possible. On the other hand, a coasting prognosis is performable with greater accuracy when the internal combustion engine is turned off to mesh a starter pinion with a rotating annular gear of a coasting internal combustion engine at an early point in time, for example.

According to a more preferred method, after reaching a first lower rotational speed threshold n equal to 850 revolutions per minute, for example, in particular a sector section up to approximately 18° is evaluated. Thus, in the case of a signal wheel having 60 marks in the form of teeth, for example, more preferably each detected mark is evaluated. A sector section of less than 18° to be evaluated includes two marks. Thus, the highest possible accuracy for the rotational speed determination of the crankshaft is achieved by already detecting and evaluating two successive teeth. Thus, according to the present invention, no more teeth are omitted to achieve an averaging.

To increase the accuracy of determining the rotational speed, an additional piece of information in the form of a time stamp is added to each detected mark. Thus, an absolute time is assigned to each detected mark instead of assigning a relative time. The rotational speed curve may thus be mapped highly accurately.

In addition, the middle of an interspace between two marks is preferably calculated from three factors, namely a rotational speed n, an angle $\alpha$ and a time stamp $t_{St}$. The actual rotational speed of the crankshaft is thus inferred more accurately. The actual rotational speed between two points is thus obtained from averaging two rotational speeds.

To also determine lower rotational speeds, according to the present invention the condition is tested that if no new mark is detected in an anticipated time $T_0$ below a certain rotational speed threshold $n_h$, then preferably there is a countdown, preferably hyperbolic, to an estimated rotational speed $n_s$, the function being $n = 1$ (revolutions/minute)/$T_{instantaneous} - T_{tooth}$ or alternatively it is a decay function as long as this definitely approaches zero or in particular there is a linear countdown by utilizing an averaged total pitch over multiple teeth of the previous coasting of the internal combustion engine.

To further improve the accuracy, the method is preferably refined as follows; in other words, when a rotational speed drops below a rotational speed threshold $n_N$, in particular according to amount, the output rotational speed is set to "0."

According to a method which refines the present invention, a check is made in one condition as to whether there has been a reversal in the direction of rotation. If this is the case, the rotational speed is set to "0" and then a calculated rotational speed n is calculated again and output when a second mark having the same direction of rotation is detected. This has the advantage of mapping the rotational speed curve accurately up to the actual standstill and to mesh with a preferably small rotational speed difference. This prevents meshing with negative rotational speeds which are too low.

According to an alternative or additional further preferred method, the accuracy for calculating the rotational speed is increased by increasing the computation cycle. A traditional computation cycle for the rotational speed and angle calculation by the engine control unit has a computation interval of 10 milliseconds, for example. The computation cycle is preferably further shortened to 5 milliseconds, in particular preferably to 1 millisecond and particularly advantageously to less than 1 millisecond. Alternatively or additionally, the rotational speed may be calculated, controlled in relation to a signal event, in particular synchronously with the mark. The detected signal may thus be made available together with a calculated rotational speed, preferably in real time.

This object is also achieved by a computer program, which may be loaded into a program memory having program instructions as the microcomputer to execute all steps of a method described above or below, in particular when the computer program product is executed in the control system. The computer program product is preferably stored on a nonvolatile memory in the form of a microchip. The computer program product may preferably be implemented as a module in an existing control system. The computer program product has the additional advantage that it is easily adaptable to empirical values and thus a maintenance or optimization of individual method steps may be implemented inexpensively with little effort.

The object is also achieved by a control system having a detection device, an evaluation device, which includes a microcomputer having a program memory for accurate detection of the rotational speed of an internal combustion engine, and by the fact that the method described above may be implemented using the control system. There are a variety of possible applications of such a control system, which may be an engine control unit, for example. It may be advantageous, for example, to provide a high-precision rotational speed detection for an accurately timed point for injection of fuel into the cylinders of an internal combustion engine or to accordingly activate valves of the internal combustion engine with high accuracy. Another preferred application presents itself for predicting the rotational speed curve of a coasting internal combustion engine when using a start-stop system of a motor vehicle to mesh with the annular gear of an internal combustion engine with the aid of a starter pinion and thereby increase the availability of a restart.

According to one preferred specific embodiment, the microcomputer of the control system operates with a computation cycle of less than 10 milliseconds, particularly preferably approximately 1 millisecond.

It is understood that features described above and those yet to be explained may be used not only in the particular indicated combination but also in other combinations.

DETAILED DESCRIPTION

Figure 1:
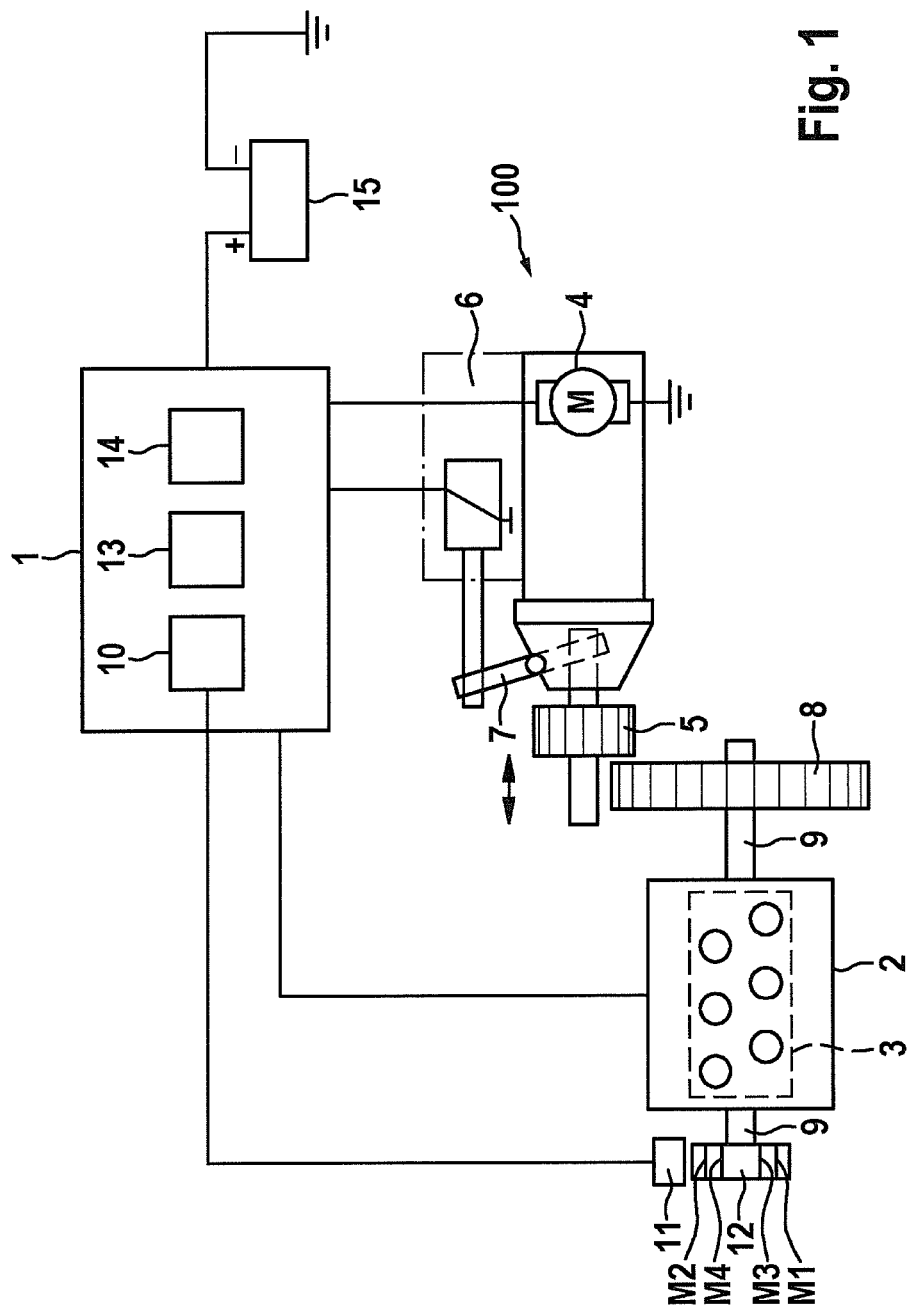
FIG. 1 shows a detail of a schematic circuit diagram of a motor vehicle having the control system according to the present invention and an internal combustion engine.

FIG. 1 shows a circuit diagram of a control system 1 for detecting the rotational speed of an internal combustion engine. Control system 1 is an engine control unit, for example, which is in informational contact and control contact with sensors and actuators of the internal combustion engine. Control system 1 also has the functions of activating a starter device 100 in a start-stop operation. For this purpose, starter device 100, including a starter motor 4 having a starter pinion 5 and a meshing device 6, is controllable by control system 1.

According to the present invention, control system 1 activates starter device 100 in such a way that starter pinion 5 meshes with an annular gear 8 of the coasting internal combustion engine 2. Starter motor 4 is therefore accelerated to a certain rotational speed and lever 7 of meshing device 6 is operated. Devices which are already present on internal combustion engine 2 are resorted to for determining rotational speed n of internal combustion engine 2 during coasting with the highest possible accuracy. A signal wheel 12 having marks in the form of teeth with a count of 60, for example, is situated on a crankshaft 9, which functions as a driveshaft. Marks M1 through M7 are detected with the aid of a sensor 11. Sensor 11 is either an optical sensor or a Hall sensor. Sensor 11 transmits the detected signals to control system 1. Control system 1 includes a microcomputer 13, a program memory 14 and a detection device 10 for detecting the signals transmitted by sensor 11. Detection device 10 may also be situated directly on sensor 11, so that detection device 10 converts the signals detected by sensor 11 into signals processable by microcomputer 13. Microcomputer 13 having a program memory 14 functions as the evaluation device to implement the method according to the present invention. Control system 1 and starter device 100 are supplied with power from a battery 15. Control system 1 detects additional states of internal combustion engine 2 with the aid of sensors and activates actuators, such as the fuel injection and possibly valve actuators, for example, which are omitted here for the sake of simplicity.

Figure 2:
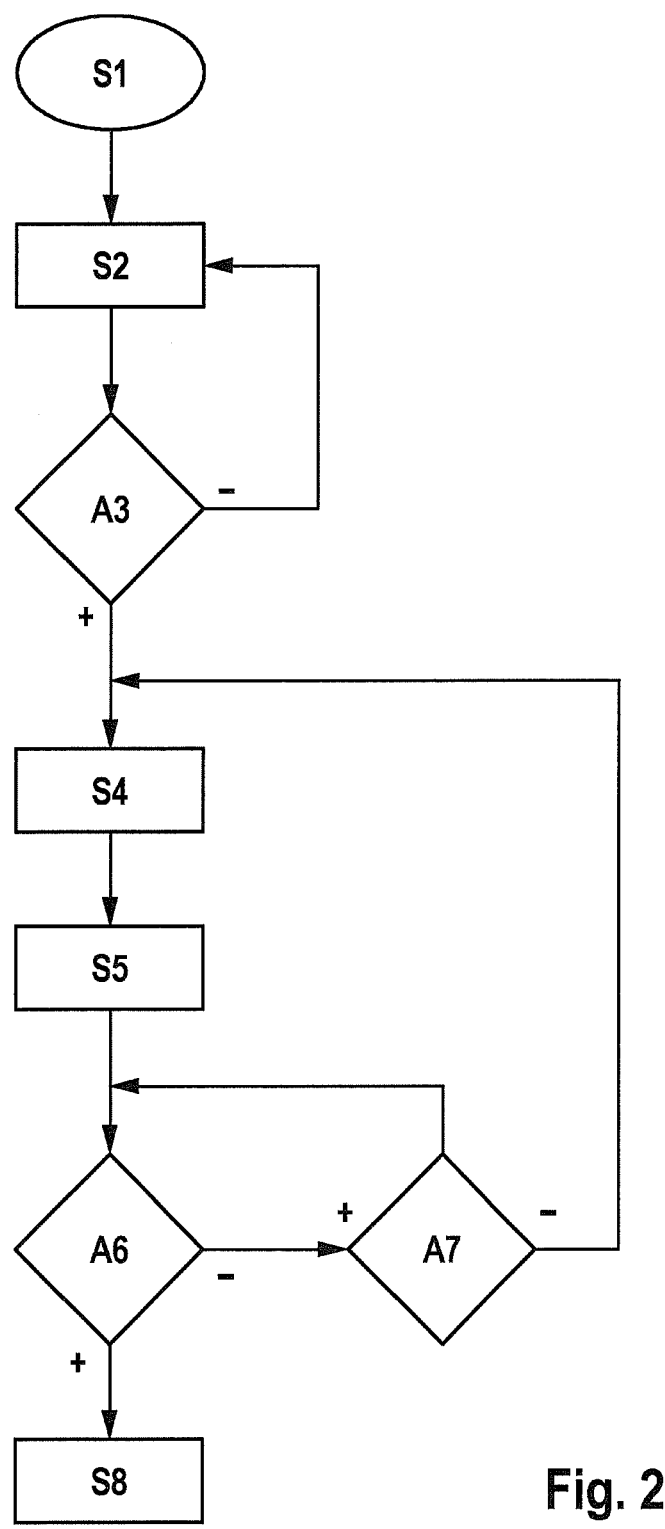
FIG. 2 shows a flow chart of a method according to the present invention for operating the control system.

FIG. 2 shows a flow chart of a method sequence such as that implemented by control system 1 according to the present invention.

In a first step S1, internal combustion engine 2 is started by starter device 100, while at the same time crankshaft 9 is synchronized with the aid of sensor 11 and detection device 10 and evaluation device 13. On the basis of marks, which are used for synchronization, these usually include the omission of teeth, i.e., tooth gaps, for adjusting the fuel injection and the valve control accordingly.

A traditional rotational speed detection takes place in a step S2, the rotational speed detection being carried out on the basis of average values of measured marks on signal wheel 12. Step S2 is optional, as is query step A3 which follows. In other words, according to special specific embodiments, a high-precision rotational speed detection may take place immediately, for example, if a computer having a 1 ms computation cycle is used. A check is made in query step A3 as to whether the rotational speed of internal combustion engine 2 is less than an idling rotational speed n, or control system 1 checks as to whether there is a stop condition after which the internal combustion engine is to be shut off due to a start-stop operation. If this query step A3 is not answered in the affirmative, then the control system will remain in optional step S2.

If query step A3 is answered in the affirmative, then a high-precision calculation of rotational speed $n_9$ of crankshaft 9 takes place in a step S4. Averaging over a larger sector section of the signal wheel is no longer taking place during the high-precision calculation but instead each detected mark is evaluated and the speed is therefore calculated. The following calculation procedure is used here:

$$n_{Motor} = \frac{60\left[\frac{s}{\min}\right]}{Z_z[-] * (t_n[s]) - t_{n-1}[s])}$$

$$\alpha_{Motor} = \alpha_{Motor-1} + \frac{360[°]}{Z_z[-]}$$

Motor = engine where $n_{engine}$ is the rotational speed of the engine calculated at point in time $t_n$; this is the average rotational speed at point in time $t_{effective}$.

In this equation, $\alpha_{engine}$ is the crankshaft angle [°] from the middle of a tooth interspace at point in time $t_{effective}$, i.e., the engine position at which the ascertained average rotational speed is effective.

$t_{effective}$ is the point in time calculated for the range assigned to $n_{engine}$ and $\alpha_{engine}$.

$Z_z$ is the number of teeth in the annular gear including the missing teeth for synchronization purposes.

$t_{n-1}$ is the absolute tooth time of the preceding tooth [s], and $t_n$ is the absolute tooth time of the instantaneous tooth [s].

Rotational speed n between two marks is thus determined with high accuracy, assuming a very small sector section, preferably between 6° and 18°. To carry out the calculation with greater accuracy, an additional piece of information in the form of an absolute time stamp is added to each detected mark. Here, the middle of each interspace between two marks is calculated from three factors, i.e., rotational speed n, an angle α and a time stamp. Thus three factors, i.e., rotational speed n, an angle α and an absolute time $t_{effective}$ are known for each mark or for the middle of each interspace between two marks.

If the rotational speed drops below a certain rotational speed threshold $n_n$ according to amount, output rotational speed n is then set to "0."

If no new mark is detected in an expected time $T_{-1}$ below a certain rotational speed threshold $n_h$, then there is a countdown hyperbolically to an estimated rotational speed $n_s$. The function of the hyperbolic countdown is defined in a calculation procedure in control system 1.

Control system 1 switches to a query step A6, where it is ascertained whether internal combustion engine 2 is stopped at a fixed rotational speed n=0. If this is not the case, then a further check of whether internal combustion engine 2 has perhaps rotated in reverse is carried out in a query step A7. If a reversal of the direction of rotation is detected, then rotational speed n is preferably set first to "0" and next a rotational speed n is again calculated and output when a second mark having the same direction of rotation is detected. In this case, control system 1 goes back to step S4; otherwise control system 1 switches again to query step A6.

If query step A6 is answered in the affirmative, control system 1 comes to an end in method step S8 since there is no rotational speed n to be detected and evaluated.

The high-precision calculation of the rotational speed in step S4 may also take place by increasing the computation cycle of microcomputer 13, for example; in other words, the computation cycle is less than 10 milliseconds, for example, 5 milliseconds or even lower than 1 millisecond. Alternatively or additionally, the computation cycle may also be event-controlled, i.e., it may be synchronized with the mark. Preferably only one computer program product is implemented in control system 1, so that the hardware side is essentially already known and is present in traditional vehicles.

Figure 3:
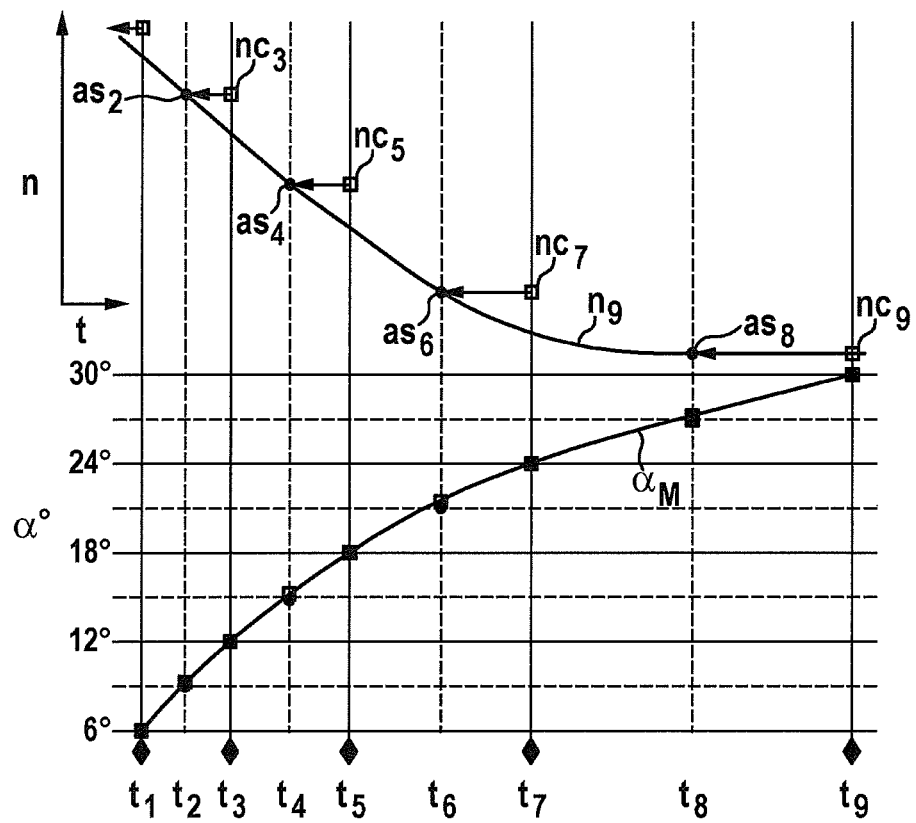
FIG. 3 shows a time-rotational speed-angle diagram including marks of a signal wheel.

FIG. 3 shows a time-rotational speed-angle diagram having marks of signal wheel 12.

A straight line $n_9$ for the rotational speed shows actual rotational speed $n_9$ over time t of crankshaft 9.

Points in time t1, t3, t5, t7 and t9 are marked beneath in mirror image using diamonds, one mark M1 through M5 in the form of a tooth being detected at each, and a calculation of rotational speed n with respect to the last mark being carried out at each. In other words, at point in time t3, signal wheel 12 has rotated by a further 6° to 12° and thus a certain rotational speed at point in time t3 is calculable. The calculated rotational speed is shown with blank squares in FIG. 3 and labeled as $n_{t3}$, $n_{t5}$, $n_{t7}$ and $n_{t9}$. To calculate rotational speed n in the middle between two marks, a time correction is calculated back using half the time between the detected times of the marks. An absolute time is always assumed. An absolute time in the form of a time stamp is therefore always added as a piece of information to each detected mark. The average rotational speed actually calculated is thus calculated from the interspace between two marks labeled as $as_2$, $as_4$, $as_6$ and $as_8$ in FIG. 3. Furthermore, calculated angles α of the middle of the interspaces between two marks are shown with dots at points in time $t_2$, $t_4$, $t_6$ and $t_8$. Actual angles α of the half-period between two marks are somewhat larger since the rotational speed drops between two marks and conversely are somewhat smaller when the rotational speed increases.

Figure 4:
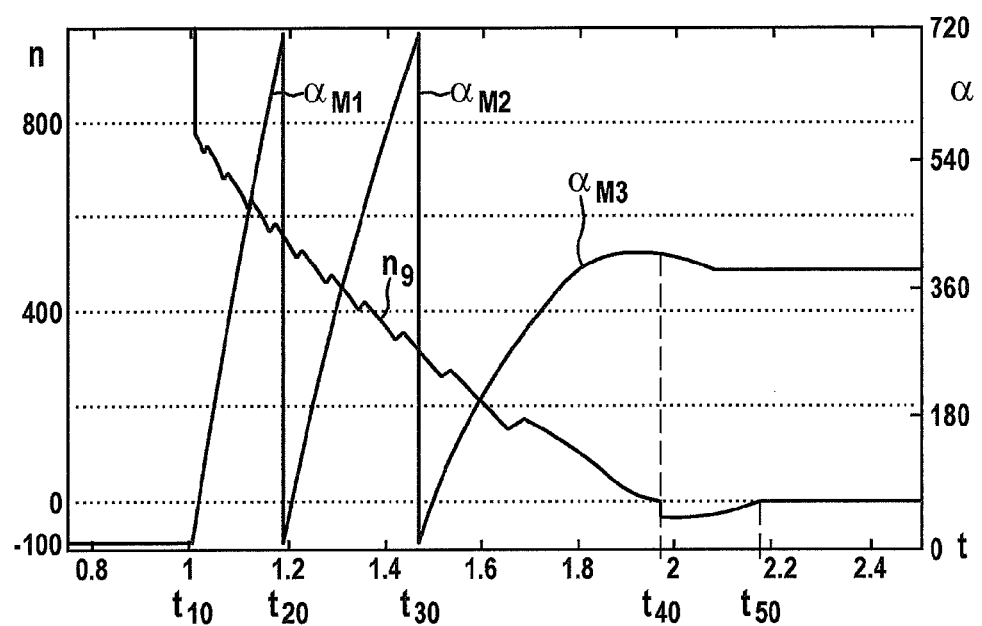
FIG. 4 shows a time-rotational speed-angle diagram in the lower rotational speed range of a coasting internal combustion engine.

FIG. 4 shows a time-rotational speed-angle diagram having the rotational speed range of a coasting internal combustion engine 2.

The x axis is time axis t; rotational speed $n_9$ of crankshaft 9 is plotted on the left side, with angle α, which is detected by detection device 10 with the aid of sensor 11, being superimposed. At point in time $t_{10}$ the rotational speed is still very high, for example, above idling speed $n_{850}$ with more than 850 revolutions per minute.

Control system 1 is switched to high-precision detection of the rotational speed at point in time $t_{10}$. Angle α is detected here by segments. This yields a characteristic line $\alpha_{M1}$. Next segment $\alpha_{M2}$ is detected at point in time $t_{20}$. The third segment $\alpha_{M3}$ is detected at point in time $t_{30}$. Rotational speed n here has dropped to less than 400 revolutions per minute, so that a further rotational speed curve $n_9$ may be assigned to segment S3. At point in time $t_{40}$ crankshaft 9 is in a zero crossing, i.e., crankshaft 9 is rotating in reverse briefly after point in time $t_{40}$ until point in time $t_{50}$ and then remains stationary after point in time $t_{50}$. FIG. 4 shows a time-rotational speed-angle diagram which is updated for each tooth.

Figure 5:
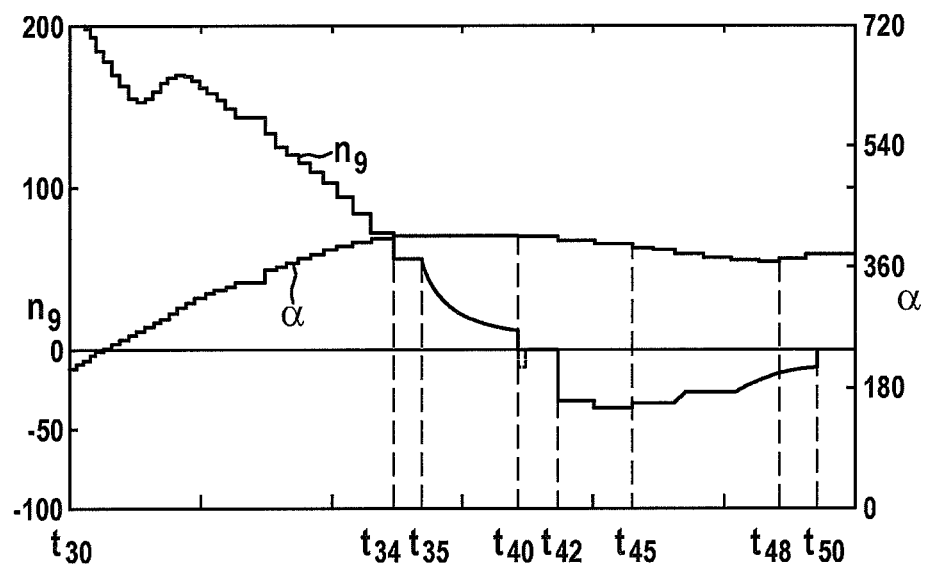
FIG. 5 shows an enlarged time-rotational speed-angle diagram from FIG. 4, in which the crankshaft of the internal combustion engine is rotating in reverse.

FIG. 5 shows an enlarged detail of the time-rotational speed-angle diagram according to FIG. 4 starting at point in time $t_{30}$. Last mark M has been detected at a point in time $t_{34}$. Starting at a point in time $t_{35}$ rotational speed $n_9$ is counted down hyperbolically, for example, at less than 100 revolutions per minute, when a new mark, i.e., a tooth here, is not detected by sensor 11 after an expected period of time. Hyperbolic decay occurs, for example, until point in time $t_{40}$. If there is a reversal in direction of rotation during the countdown, i.e., a tooth is detected in another direction, then the countdown is continued with a changed sign of the rotational speed; cf. dashed rotational speed curve. According to a preferred variant, which is represented with a solid line at point in time $t_{40}$, when there is a change in the direction of rotation, the rotational speed is set to zero according to a calculation procedure for moving in reverse instead of calculating negative rotational speeds since this corresponds to a continuous rotational speed curve. Only at a second tooth in the same direction of rotation is a calculated, possibly negative, rotational speed output. If a reversal of the direction of rotation is detected, the rotational speed calculation remains active. Starting at point in time $t_{42}$, a second tooth has been detected so that negative rotational speeds are detected, for example, in the range of 40 revolutions per minute. Here again, in the negative rotational speed range, the rotational speed decays hyperbolically toward "0" in time range $t_{48}$ to time $t_{50}$ until a rotational speed $n_9$ of less than 10 revolutions per minute, for example, is detected and calculated, which is evaluated as a standstill with a rotational speed $n_0$ equal to zero. A flag is preferably set as soon as the countdown is begun and the flag is deleted upon leaving this state. This has the advantage that this state is marked explicitly for other functions, for example, as a suitable meshing point in time.

Figure 6:
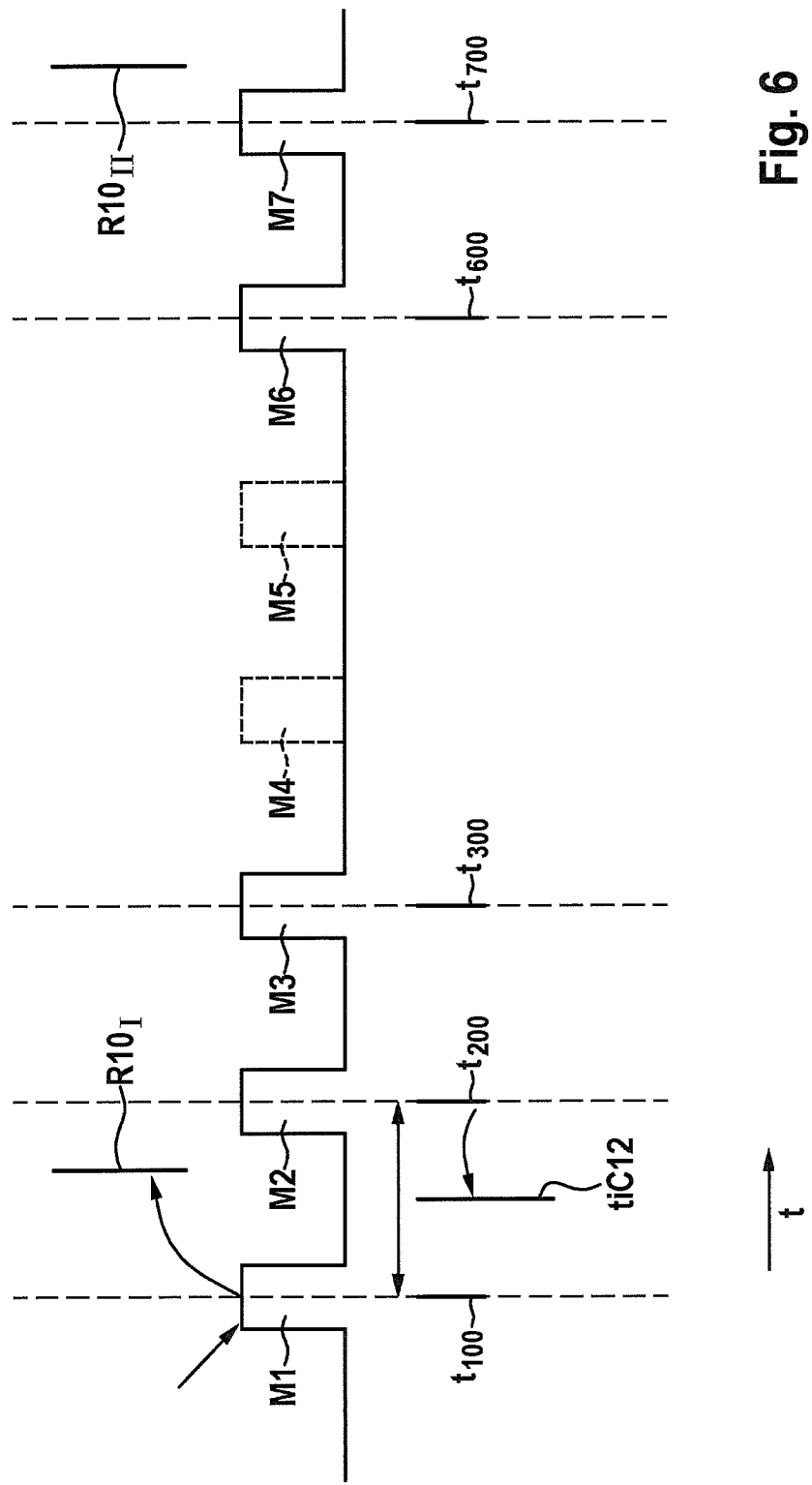
FIG. 6 shows a time-computation cycle diagram.

FIG. 6 shows a time-computation cycle diagram with a comparison of the traditional rotational speed calculation and the precision rotational speed calculation according to the present invention. A physical mark signal in the form of teeth is represented by square teeth having marks M1, M2, M3, M6 and M7. Marks M4 and M5 are tooth gaps for synchronizing signal wheel 12. Vertical bars $R10_I$, $R10_{II}$ indicate a 10 millisecond computation grid in the traditional calculation, which may be used over multiple teeth averaged in one computation step, for example. However, marks M1 through M7 are detected at points in time $t_{100}$, $t_{200}$, $t_{300}$, $t_{600}$ and $t_{700}$ according to the novel scanning method and used for the rotational speed calculation. Traditionally the relative rotational speed times are recorded in a table and the average of six teeth, for example, is calculated.

In the method according to the present invention, the calculation is extrapolated to a point in time tiC12 ($=t_{effective}$), which occurs between two signal marks in M1 and M2, for example. The absolute times are preferably recorded. The half between the tooth times is calculated back. Rotational speed n is thus formed from an interval of time between the last two mark signals up to x. In a second step, angle α of the tooth at the calculation point in time is subtracted from half the tooth-to-tooth distance to establish the middle between the two marks. For determining point in time tiC12 to which the calculation is extrapolated, instantaneous absolute calculation point in time $t_{200}$ is calculated back by subtracting the half period from the point in time of the first mark to the second mark. Alternatively, relative tooth times may also be recorded and the rotational speed calculated from them.

Figure 7:
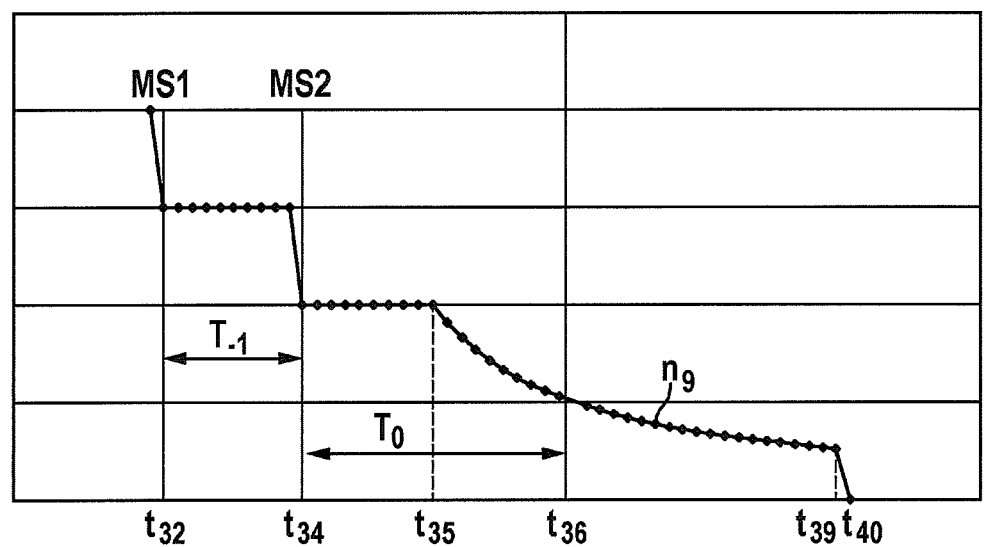
FIG. 7 shows a time-rotational speed diagram with respect to low rotational speeds.

FIG. 7 shows an enlarged detail of FIG. 5 with respect to the hyperbolic countdown. At a point in time $t_{32}$, there is a physical mark signal MS1. After a period $T_{-1}$, a second physical mark signal MS2 is detected at point in time $t_{34}$. Rotational speed $n_9$ is kept at a constant value in microcomputer 13 as long as new period $T_0$ is less than $T_{-1}$. If period $T_0$ exceeds period $T_{-1}$, then a hyperbolic countdown is initiated according to a known computation procedure so that a rotational speed of less than 10 revolutions per minute is detected at point in time $t_{39}$. At point in time $t_{40}$, a rotational speed of zero revolutions is thus assumed, where $$n = 60 \frac{[s/\min.]}{T_0[s] * Z_z[-]}.$$

The instantaneous time of the measurement is $t_{36}$ and $t_{35}$ is period $T_0$ to be measured, which is equal to $t_{36}$-$t_{34}$. All figures show only schematic diagrams not drawn to scale. Otherwise, reference is made in particular to the drawings as being relevant to the present invention.

What is claimed is:

1. A method for detecting a rotational speed of an internal combustion engine including a signal wheel having marks for signaling on a crankshaft of the internal combustion engine, the method comprising:
   detecting the marks on the signal wheel by a detection and evaluation device with the aid of a sensor;
   evaluating the rotational speed to increase an accuracy on the basis of a reduced sector section of the signal wheel having a sector section of approximately 6° to 35°; and
   testing a condition that if no new mark is detected within an expected time below a rotational speed threshold, then one of:
      a hyperbolic countdown is implemented to an estimated rotational speed, and
      a function is provided that is a decay function as long as one of the function is definitely approaching zero and a linear countdown occurs.

2. The method as recited in claim 1, wherein if the rotational speed drops below a further rotational speed threshold, then an output rotational speed is set to zero.

3. The method as recited in claim 1, wherein when a reversal in a direction of rotation is detected, the rotational speed is set to zero and then a calculated rotational speed is calculated again and output when a second mark having the same direction of rotation is detected.

4. The method as recited in claim 1, wherein at least one of:
   a computation cycle is increased, and
   the rotational speed is calculated and controlled in relation to a signal event.

5. The method as recited in claim 4, wherein the computation cycle is increased to 5 ms.

6. The method as recited in claim 4, wherein the computation cycle is increased to 1 ms.

7. The method as recited in claim 4, wherein the computation cycle is less than 1 ms.

8. The method as recited in claim 4, wherein the rotational speed is controlled synchronously with the mark.

9. A non-transitory, computer-readable data storage medium storing a computer program having program codes which, when executed on a microcomputer, performs a method for detecting a rotational speed of an internal combustion engine including a signal wheel having marks for signaling on a crankshaft of the internal combustion engine, the method comprising:
   detecting the marks on the signal wheel by a detection and evaluation device with the aid of a sensor;

evaluating the rotational speed to increase an accuracy on the basis of a reduced sector section of the signal wheel having a sector section of approximately 6° to 35°; and testing a condition that if no new mark is detected within an expected time below a rotational speed threshold, then one of:
- a hyperbolic countdown is implemented to an estimated rotational speed, and
- a function is provided that is a decay function as long as one of the function is definitely approaching zero and a linear countdown occurs.

10. A control system, comprising:

a detection device; and an evaluation device that includes a microcomputer having a program memory for a high-precision detection of a rotational speed of an internal combustion engine, the program memory including instructions for executing a method for detecting the rotational speed of the internal combustion engine including a signal wheel having marks for signaling on a crankshaft of the internal combustion engine, the method comprising:

detecting the marks on the signal wheel by a detection and evaluation device with the aid of a sensor;

evaluating the rotational speed to increase an accuracy on the basis of a reduced sector section of the signal wheel having a sector section of approximately 6° to 35'; and testing a condition that if no new mark is detected within an expected time below a rotational speed threshold, then one of:
- a hyperbolic countdown is implemented to an estimated rotational speed, and
- a function is provided that is a decay function as long as one of the function is definitely approaching zero and a linear countdown occurs.

11. The control system as recited in claim 10, wherein the high-precision detection is for a start-stop system of a motor vehicle.

12. The control system as recited in claim 10, wherein the method is executable for predicting a rotational speed curve of the internal combustion engine when coasting.

\* \* \* \* \*